US012699642B2

(12) United States Patent
Barron et al.

(10) Patent No.: US 12,699,642 B2
(45) Date of Patent: Aug. 4, 2026

(54) EFFICIENT DIAGNOSIS OF LOGS BASED ON EVENTS

(71) Applicant: INTERNATIONAL BUSINESS MACHINES CORPORATION, Armonk, NY (US)

(72) Inventors: Robert Barron, Tel Aviv (IL); Seema Nagar, Bangalore (IN)

(*) Notice: Subject to any disclaimer, the term of this patent is extended or adjusted under 35 U.S.C. 154(b) by 153 days.

(21) Appl. No.: 18/125,900

(22) Filed: Mar. 24, 2023

(65) Prior Publication Data

US 2024/0320128 A1    Sep. 26, 2024

(51) Int. Cl.
*G06F 11/362* (2025.01)
*G06F 9/54* (2006.01)
*G06F 11/07* (2006.01)

(52) U.S. Cl.
CPC ............ *G06F 11/366* (2013.01); *G06F 9/542* (2013.01); *G06F 11/0709* (2013.01); *G06F 11/0754* (2013.01)

(58) Field of Classification Search
CPC ............ G06F 11/0709; G06F 11/0754; G06F 11/0781; G06F 11/366; G06F 9/542
See application file for complete search history.

(56) References Cited

U.S. PATENT DOCUMENTS

| | | | |
|---|---|---|---|
| 8,887,286 B2 | 11/2014 | Dupont et al. | |
| 10,567,412 B2 | 2/2020 | Merza et al. | |
| 11,087,014 B2 | 8/2021 | Levy et al. | |
| 2016/0124793 A1 | 5/2016 | Ruan et al. | |
| 2017/0109654 A1* | 4/2017 | Caffrey ................. | H04L 41/142 |
| 2018/0004824 A1 | 1/2018 | Russell et al. | |
| 2020/0073740 A1* | 3/2020 | Ohana ................. | G06F 11/0793 |
| 2020/0133760 A1* | 4/2020 | Volkov ................ | G06F 11/0754 |
| 2020/0184355 A1 | 6/2020 | Mehta et al. | |
| 2022/0060371 A1 | 2/2022 | Paradkar et al. | |
| 2023/0031109 A1* | 2/2023 | Fettaya .................. | G06N 20/10 |
| 2024/0160509 A1* | 5/2024 | Lal ......................... | G06F 11/004 |

(Continued)

OTHER PUBLICATIONS

Akkiraju, "Harvesting insights from logs in IT Operations Management in an economically viable manner", https://medium.com/IBM-cloud/harvesting-insights-from-logs-in-it-operations-management-in-an-economically-viable-manner-44a4debe3746, May 24, 2022, 9 pages.

(Continued)

*Primary Examiner* — Bryce P Bonzo
*Assistant Examiner* — Sean Kevin Mcnamara
(74) *Attorney, Agent, or Firm* — Seed Intellectual Property Law Group LLP

(57) ABSTRACT

A method, system, and computer program product for diagnosing IT logs based on events are configured to: receive a notification of an incident associated with an application; obtain data defining a set of events related to the application for a predefined range of time; create a timeseries of each type of event in the set of events; compute an event change score for each respective type of event for windows of the range of time based the timeseries of the respective type of event; compute an overall score for each of the windows based on the respective event change scores of the respective event types for each of the windows; and identify respective ones of the windows as a region of interest based on the overall score of the respective ones of the windows exceeding a threshold.

20 Claims, 3 Drawing Sheets

(56) References Cited

U.S. PATENT DOCUMENTS

2024/0289201 A1 * 8/2024 Nagar ................. G06F 11/0751

OTHER PUBLICATIONS

Tozzi, "The 3 pillars of observability: Logs, metrics and traces", https://www.techtarget.com/searchitoperations/tip/The-3-pillars-of-observability-Logs-metrics-and-traces?vgnextfmt=print, archived on Feb. 15, 2023, 3 pages.

Anonymous, "What Is Cloud Native?", https://aws.amazon.com/what-is/cloud-native/#:~:text=The term cloud native refers,container orchestrators%2C and auto scaling., archived on Mar. 4, 2023, 10 pages.

Akkiraju et al., "Why is Log Parsing and Processing hard?", https://medium.com/IBM-cloud/why-is-log-parsing-and-processing-hard-1e72bac55712, archived on Feb. 15, 2023, 6 pages.

Fu et al., "Exploring Event Correlation for Failure Prediction in Coalitions of Clusters", Nov. 2007, 12 pages.

Landauer et al., "Dynamic log file analysis: An unsupervised cluster evolution approach for anomaly detection", Sep. 4, 2018, 23 pages.

* cited by examiner

100 ⬎

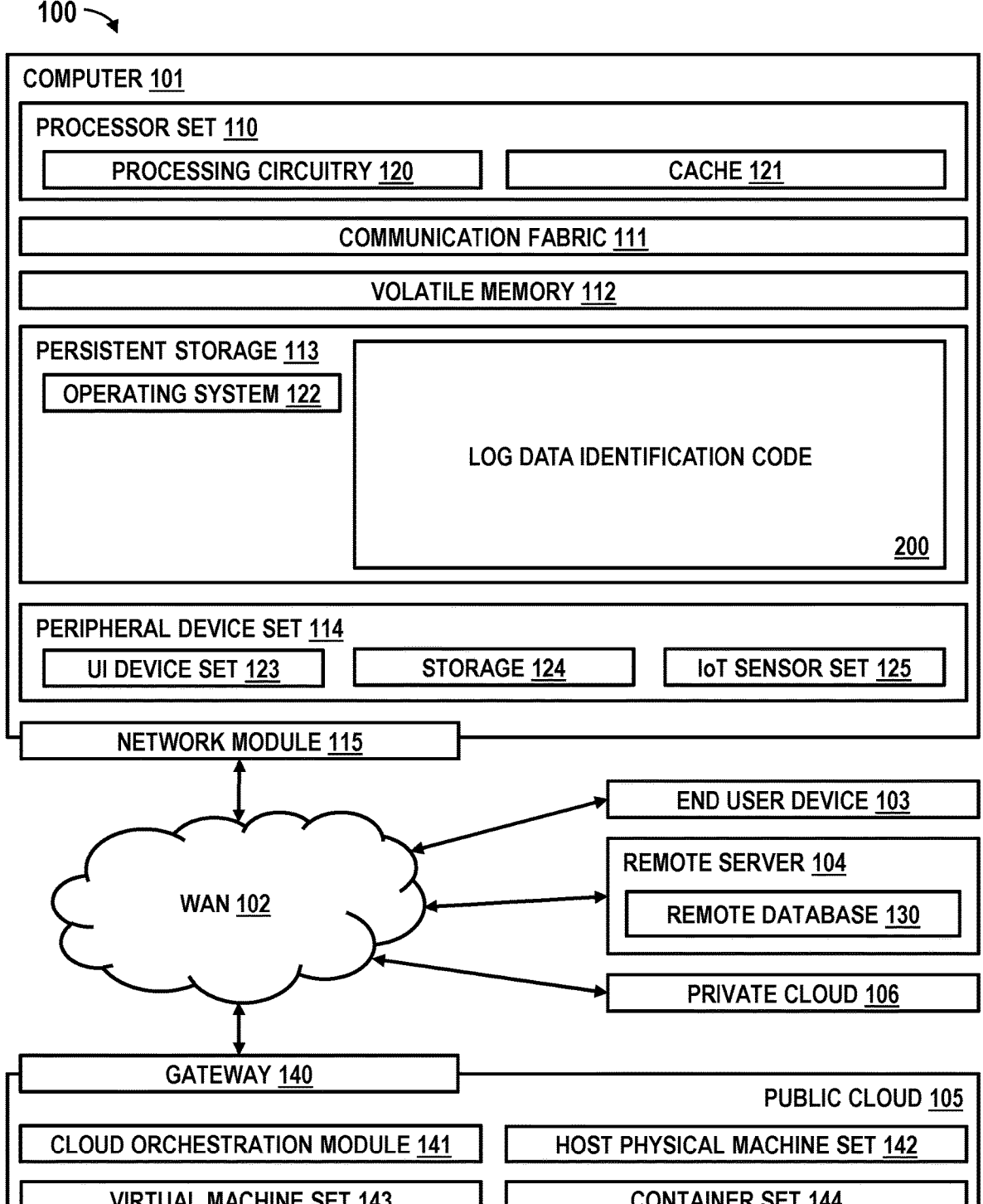

COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM 122

LOG DATA IDENTIFICATION CODE

200

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

FIG. 1

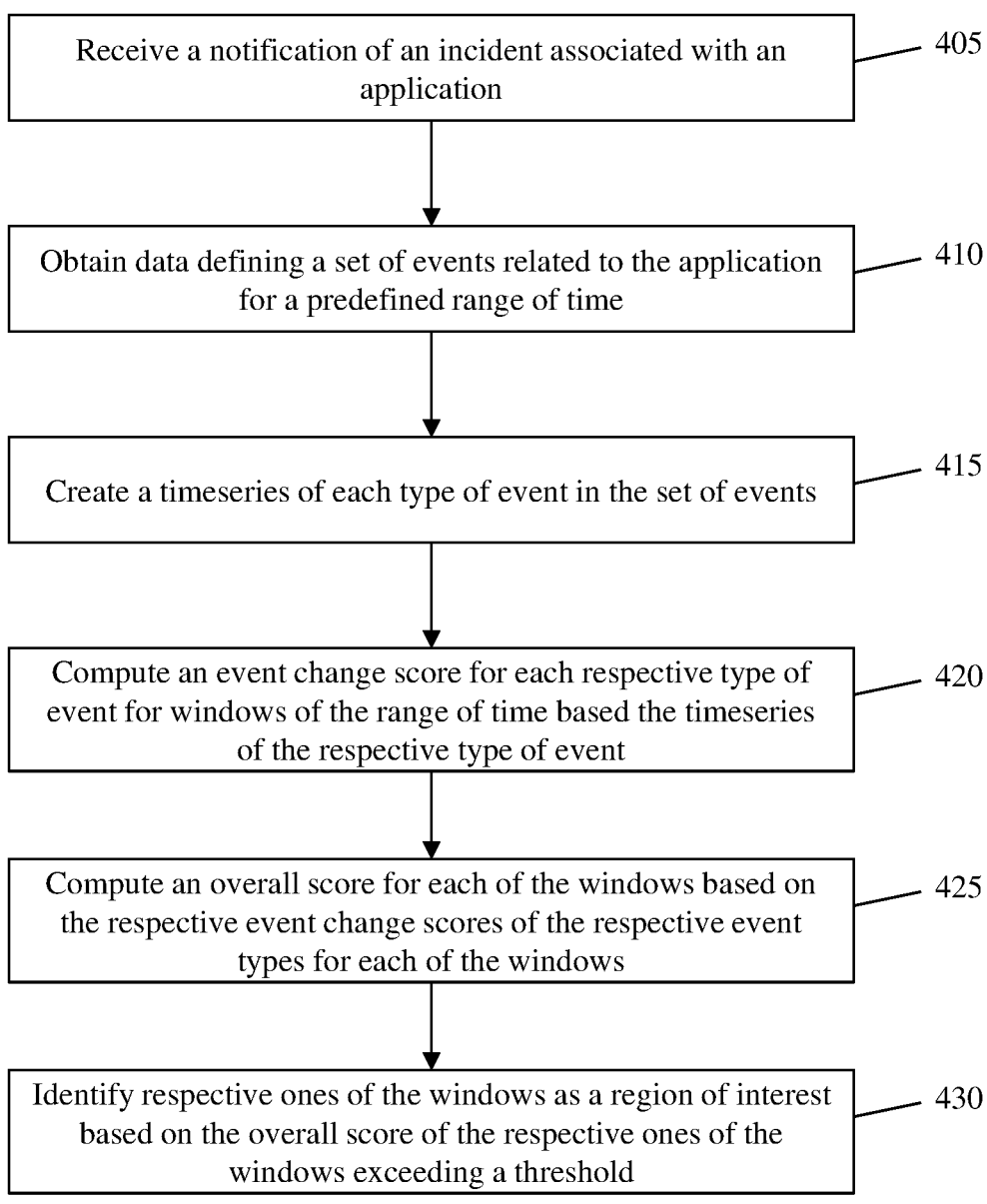

Receive a notification of an incident associated with an application — 405

Obtain data defining a set of events related to the application for a predefined range of time — 410

Create a timeseries of each type of event in the set of events — 415

Compute an event change score for each respective type of event for windows of the range of time based the timeseries of the respective type of event — 420

Compute an overall score for each of the windows based on the respective event change scores of the respective event types for each of the windows — 425

Identify respective ones of the windows as a region of interest based on the overall score of the respective ones of the windows exceeding a threshold — 430

FIG. 4

EFFICIENT DIAGNOSIS OF LOGS BASED ON EVENTS

BACKGROUND

Aspects of the present invention relate generally to information technology (IT) operations management and, more particularly, to diagnosing IT logs based on events.

Distributed systems such as applications on the cloud often exhibit anomalous behavior such as outages or incidents. Investigating anomalous behavior, e.g., by detecting and analyzing the anomalous behavior, is a common practice in IT operations management for the purpose of improving system performance. Traces, metrics, and logs are sources of information that are commonly used to investigate anomalous behavior.

SUMMARY

In a first aspect of the invention, there is a computer-implemented method including: receiving, by the processor set, a notification of an incident associated with an application; obtaining, by the processor set, data defining a set of events related to the application for a predefined range of time; creating, by the processor set, a timeseries of each type of event in the set of events; computing, by the processor set, an event change score for each respective type of event for windows of the range of time based the timeseries of the respective type of event; computing, by the processor set, an overall score for each of the windows based on the respective event change scores of the respective event types for each of the windows; and identifying, by the processor set, respective ones of the windows as a region of interest based on the overall score of the respective ones of the windows exceeding a threshold.

In another aspect of the invention, there is a computer program product including one or more computer readable storage media having program instructions collectively stored on the one or more computer readable storage media. The program instructions are executable to: receive a notification of an incident associated with an application; obtain data defining a set of events related to the application for a predefined range of time; create a timeseries of each type of event in the set of events; compute an event change score for each respective type of event for windows of the range of time based the timeseries of the respective type of event; compute an overall score for each of the windows based on the respective event change scores of the respective event types for each of the windows; and identify respective ones of the windows as a region of interest based on the overall score of the respective ones of the windows exceeding a threshold.

In another aspect of the invention, there is a system including a processor set, one or more computer readable storage media, and program instructions collectively stored on the one or more computer readable storage media. The program instructions are executable to: receive a notification of an incident associated with an application; obtain data defining a set of events related to the application for a predefined range of time; create a timeseries of each type of event in the set of events; compute an event change score for each respective type of event for windows of the range of time based the timeseries of the respective type of event; compute an overall score for each of the windows based on the respective event change scores of the respective event types for each of the windows; and identify respective ones of the windows as a region of interest based on the overall score of the respective ones of the windows exceeding a threshold.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIG. 4 shows a flowchart of an exemplary method in accordance with aspects of the present invention.

DETAILED DESCRIPTION

Figure 2:
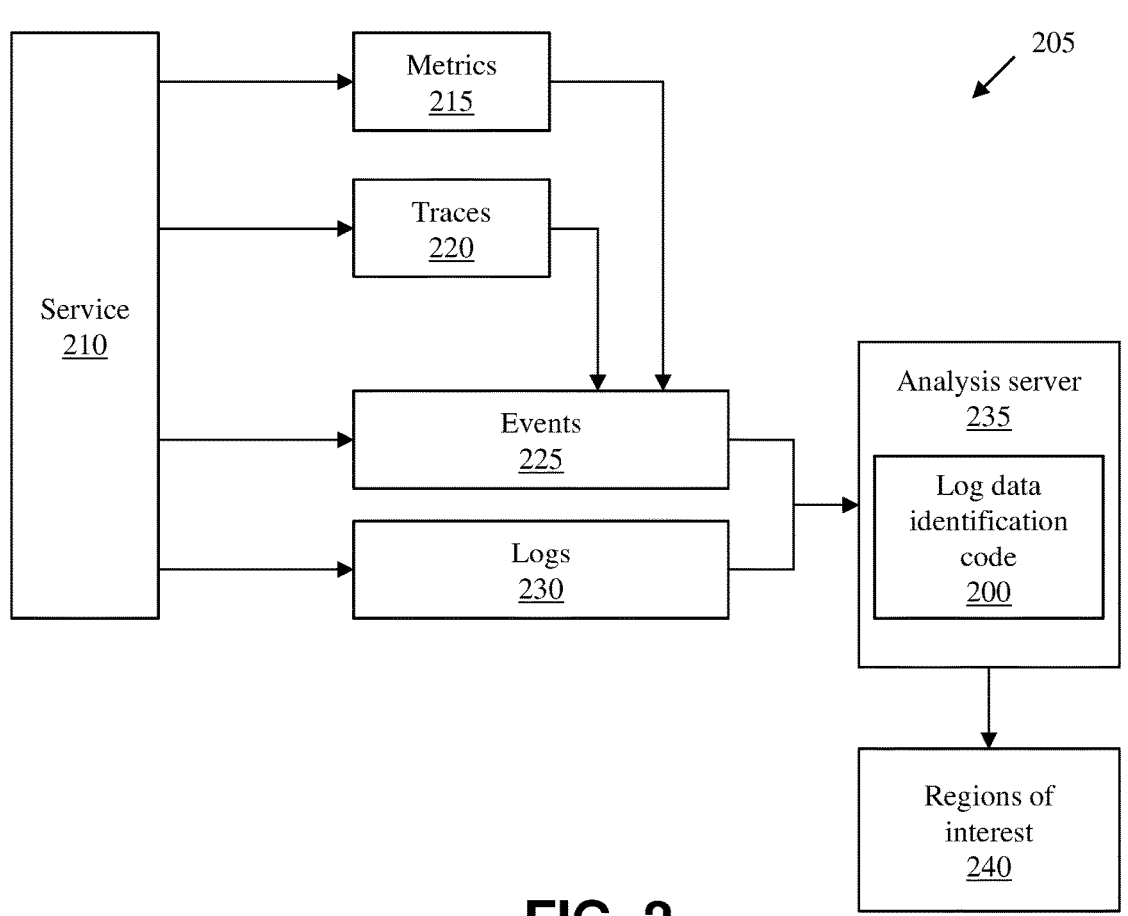
FIG. 2 shows a block diagram of an exemplary environment in accordance with aspects of the present invention.

Aspects of the present invention relate generally to information technology (IT) operations management and, more particularly, to diagnosing IT logs based on events. Implementations of the invention provide systems, methods, and computer program products that identify regions of IT logs in which to conduct incident diagnosis and debugging of an application by leveraging events raised by the application. In embodiments, the systems, methods, and computer program products are configured to compute event change scores by aggregating changes, thereby accommodating the types of events. In embodiments, the systems, methods, and computer program products are configured to incorporate the scores of events to identify (e.g., determine) regions of the logs to be investigated.

Traces, metrics, and logs are sources of information that site reliability engineers (SREs) use to investigate anomalous behavior of an application. These three sources of information are referred to the pillars of observability. Logs are files that record events, warnings, and errors as they occur within a software environment. Metrics are quantifiable measurements that reflect the health and performance of applications or infrastructure. A trace is data that tracks an application request as it flows through the various parts of an application.

Unfortunately, metrics and traces may not always be available or may be difficult for an SRE to analyze. Often SREs don't have access to raw metrics as the raw metrics are being analyzed by a third-party tool and only events (e.g., threshold violations) are reported. Traces require more advanced monitoring tools and developer collaboration to generate, and they are not as generally available as metrics and logs. Also, metrics and traces generated a lot of data, which is not always easy to process or understand the value of.

Instead of analyzing raw metrics and trace data, SREs view the events which are generated by third party tools that perform automated monitoring tasks. Events recorded by such tools include monitoring threshold violations, topology changes, infrastructure changes, DevOps changes, and more. Some events are derived from metrics and traces, and some are discrete events generated by a change in the environment. Once an incident is generated based on one or more events, an SRE will typically debug and diagnose the issue by looking for and examining logs.

Information Technology (IT) logs are generated by software systems during the execution of a program in production environments for problem detection and diagnosis in IT operations management. Logs contain information about errors, exceptions, warnings, informational events, and other diagnostic information. Logs are semi-structured machine-generated data. They can come in many formats, structures, languages, and large volumes. These multi-dimensional attributes of logs pose many challenges in parsing and processing logs. IT logs are an important source of information in IT operations management. However, deriving insights from logs is a hard problem because logs are not often standardized, come in many formats, and are voluminous. For example, log volumes can run up to several terabytes of data per day. This volume of data cannot be analyzed manually in any reasonable amount of time.

Moreover, dynamically determining the significant portions (e.g., regions) of logs to look into is not an automated process. How much of a log to analyze prior to an incident is either determined using a preconfigured window of time (which is predefined and thus not dynamic), or by using SRE experience (which is manual and thus not automated). In automated log analysis tools, the duration of logs to investigate before an incident is preconfigured and, thus, does not reflect the actual real-time conditions that might be related to the incident. Because automated log analysis tools depend on pre-defined rules, they do not take into account the way the environment may be changing dynamically. Implementations of the invention address this problem by providing an automated way to dynamically determine regions of interest of logs for analyzing relative to an incident. Embodiments dynamically determine the regions of the logs based on other events.

Implementations of the invention provide for identifying optimal regions of IT logs on which to perform incident diagnosis and debugging from streaming logs in a cloud-native application. In embodiments, the identified optimal regions are determined based on a window size. Embodiments leverage events as a modality to dynamically determine the optimal regions of the logs to analyze. An exemplary method according to the present disclosure includes: receiving a notification of an incident associated with an application (e.g., an impending incident or an ongoing incident); obtaining data defining a set of events related to the application for a predefined range of time (e.g., from the current time T backward to a time T-Tmax where Tmax is a predefined amount of time that defines the range); creating a timeseries for each type of event in the set of events; generating an event change score for each type of event for each window based on the timeseries of the type of event; computing an overall score for each window based on the respective event change scores of the event types for each window; identifying a window as a region of interest based on the overall score of the window exceeding a threshold. In embodiments, the events in the set of events are metrics-based events that are derived from, inferred from, or detected on top of metrics; however, the algorithms described herein to identify optimal regions do not utilize the actual metrics data itself. In one example, the method aggregates the windows to find regions where the event change score is a above a threshold, where the event change score for a window is computed as a z-score on a moving average and standard deviation of the timeseries in the window. In this example, the method aggregates the regions across all events where the metric change score is high. In embodiments, the method may optionally use change-based events to corroborate the optimal regions that are identified using metric-based events.

In accordance with aspects of the invention, a method obtains or receives data defining metrics-based events associated with an application and during a time period associated with an incident. There may be multiple different types of events included in the metrics-based events, such as HTTP delay, request timeout, CPU level higher than a threshold, memory usage higher than a threshold, available memory lower than a threshold, disk usage higher than a threshold, available disk lower than a threshold, and network congestion above a threshold, to name but a few. These events are examples, and different metrics-based events may be included. In embodiments, the method includes creating a multivariate times series by aggregating events of each type of event at a window size. In embodiments, the method includes, for the univariate time series for each type of event in the multivariate time series: computing a moving average with standard deviation and lag; and computing a z-score for each point in the time series using the moving average and standard deviation. If the z-score for a point in the times series is above a threshold value, then that point in the time series is labeled as a high event change score. Otherwise, if the z-score for a point in the times series is below the threshold value, then that point in the time series is labeled as a low event change score. In embodiments, the method aggregates the labels across all types of events for each window. For each window, if a majority of the types of events are labeled as high event change score, then that window is identified as a region of interest and added to a list of identified regions of intertest to be analyzed. On the other hand, if a majority of the types of events are labeled as low event change score for a particular window, then that window is not identified as a region of interest and is not added to a list of identified regions of intertest to be analyzed. In embodiments, the list of identified regions of intertest is used to determine portions of IT log data to be analyzed. In this manner, implementations of the invention use events to identify regions of interest of IT log data for analyzing an incident.

In embodiments, the different types of events may be weighted with importance scores. In these embodiments, the label aggregation is weighted by the importance scores of the individual types of events, and a window is added to the regions of interest (e.g., to be analyzed) if the aggregated label score is above a threshold.

In embodiments, the method uses change-based events to corroborate the regions of interest that are identified using metrics-based events as described above. In embodiments, the corroborating comprises for each of the windows identified as a region of interest: retaining the respective one of the windows as a region of interest based on determining a change-based event occurred in the respective one of the windows; and eliminating the respective one of the windows as a region of interest based on determining a change-based event did not occur in the respective one of the windows.

Embodiments as described herein dynamically determine portions of IT log data to analyze for an incident and, thus, provide an improvement over conventional processes that determine portions of IT log data to analyze based on a preconfigured window. Such conventional process are over-inclusive because they select the log data in static manner based on a preconfigured window of time, rather than in a dynamic manner based on events. This over-inclusiveness results in more time and effort spent analyzing log data that has a lower likelihood of being pertinent to the incident. By dynamically determine portions of IT log data to analyze for an incident, implementations of the invention reduce the amount of log data to be analyzed compared to that of conventional processes, which saves time and effort when performing incident analysis.

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as log data identification code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary environment 205 in accordance with aspects of the invention. In embodiments, the environment includes a service 210 in a cloud computing environment. The service 210 may comprise business logic, an application, middleware, infrastructure, or a platform. In an embodiment, the service 210 comprises a cloud-native application. The term cloud-native refers to an application that was designed to reside in the cloud from the start. Cloud-native involves cloud technologies like microservices, container orchestrators, and auto scaling. A cloud-enabled application differs from a cloud-native application because the cloud-enabled application doesn't have the flexibility, resiliency, or scalability of its cloud-native counterpart. This is because cloud-enabled applications retain their monolithic structure even though they have moved to the cloud.

As shown in FIG. 2, metrics 215, traces 220, events 225, and logs 230 may be derived from the service 210. Metrics 215 are quantifiable measurements that reflect the health and performance of applications or infrastructure. Traces 220 are data that tracks an application request as it flows through the various parts of an application. Logs 230 are files that record events 225. Events 225 may comprise metrics-based events in which a measured metric exceeds a threshold value. Examples of metrics-based events include but are not limited to: HTTP delay, request timeout, CPU level higher than a threshold, memory usage higher than a threshold, available memory lower than a threshold, disk usage higher than a threshold, available disk lower than a threshold, and network congestion above a threshold. Events 225 may also comprise change-based events that arise from a change in the service 210. Examples of change-based events include but are not limited to: install a new component or application; upgrade an existing component or application to a new version; and move a component or application to a different network location. Logs 230 may comprise IT log data. The events 225 may be included in the data in the logs 230. The metrics 215, traces 220, events 225, and logs 230 may be obtained for the service 210 using one or more system monitoring tools as understood by those of ordinary skill in the art.

In accordance with aspects of the invention, the environment 205 includes an analysis server 235 that runs the log data identification code 200 of FIG. 1. The server 235 may comprise one or more instances of computer 101 of FIG. 1. The server 235 may alternatively comprise one or more virtual machines or one or more containers running on one or more instances of computer 101 of FIG. 1. In an exemplary implementation, the service 210 is part of the public cloud 105 or private cloud 106 of FIG. 1, the metrics 215, traces 220, events 225, and logs 230 are obtained by one or more monitoring tools running on the remote server 104 of FIG. 1, and the server 235 obtains the logs 230 including the events 225 via the WAN 102 of FIG. 1.

The log data identification code 200 may comprise routines, programs, objects, components, logic, data structures, and so on that perform particular tasks or implement particular data types to carry out the functions and/or methodologies of embodiments of the invention as described herein. The log data identification code 200 is executable by the processing circuitry 120 of FIG. 1 to perform the inventive methods as described herein. The server 235 may include additional or fewer code modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, the log data identification code 200 is configured to: receive a notification of an incident associated with the service 210 (e.g., a cloud-native application); obtain data defining a set of events related to the service 210 for a predefined range of time; create a timeseries of each type of event in the set of events; compute an event change score for each respective type of event for windows of the range of time based on the timeseries of the respective type of event; compute an overall score for each of the windows based on the respective event change scores of the respective event types for each of the windows; and identify respective ones of the windows as a region of interest based on the overall score of the respective ones of the windows exceeding a threshold. In embodiments, the code 200 creates a list of regions of interest 240 that includes the identified regions of interest.

In an exemplary use case, the log data identification code 200 is configured to obtain or receive data defining metrics-based events associated with an application and during a time period associated with an incident. The application may be a cloud-native application included in the service 210, and the metrics-based events may be a subset of events 225 that are derived from the metrics 215 and that are associated with the application. In this use case, the log data identification code 200 is configured to create a multivariate times series by aggregating events of each type of event at a window size. The window size may be predefined as 'w' which may be a user-configurable setting of the code 200. In this use case, the log data identification code 200 is configured to, for the univariate time series for each type of event in the multivariate time series: compute a moving average with standard deviation and lag; and compute a z-score for each point in the time series using the moving average and standard deviation. If the z-score for a point in the times series is above a threshold value, then that point in the time series is labeled as a high event change score. Otherwise, if the z-score for a point in the times series is below the threshold value, then that point in the time series is labeled as a low event change score. In this use case, the log data identification code 200 is configured to aggregate the labels across all types of events for each window. For each window, if a majority of the types of events are labeled as high event change score, then that window is identified as a region of interest and added to a list of identified regions of intertest to be analyzed. On the other hand, if a majority of the types of events are labeled as low event change score for a particular window, then that window is not identified as a region of interest and is not added to a list of identified regions of interest 240 to be analyzed. In this use case, the log data identification code 200 is configured to use the list of identified regions of interest 240 to determine portions of IT log data from the logs 230 to be analyzed for this incident.

In embodiments, the different types of events may be weighted with importance scores. In these embodiments, the label aggregation is weighted by the importance scores of the individual types of events, and a window is added to the regions of interest 240 (e.g., to be analyzed) if the aggregated label score is above a threshold.

In embodiments, the log data identification code 200 is configured to use change-based events to corroborate the regions of interest that are identified using metrics-based events as described above. The change-based events may be another subset of events 225 that are derived from the service 210. The change-based events may be associated with the application but need not be associated with the application since changes to other components of the service 210 might somehow be related to the incident. In embodiments, the corroborating comprises for each of the windows identified as a region of interest: retaining the respective one of the windows as a region of interest based on determining a change-based event occurred in the respective one of the windows; and eliminating the respective one of the windows as a region of interest based on determining a change-based event did not occur in the respective one of the windows.

Figure 3:
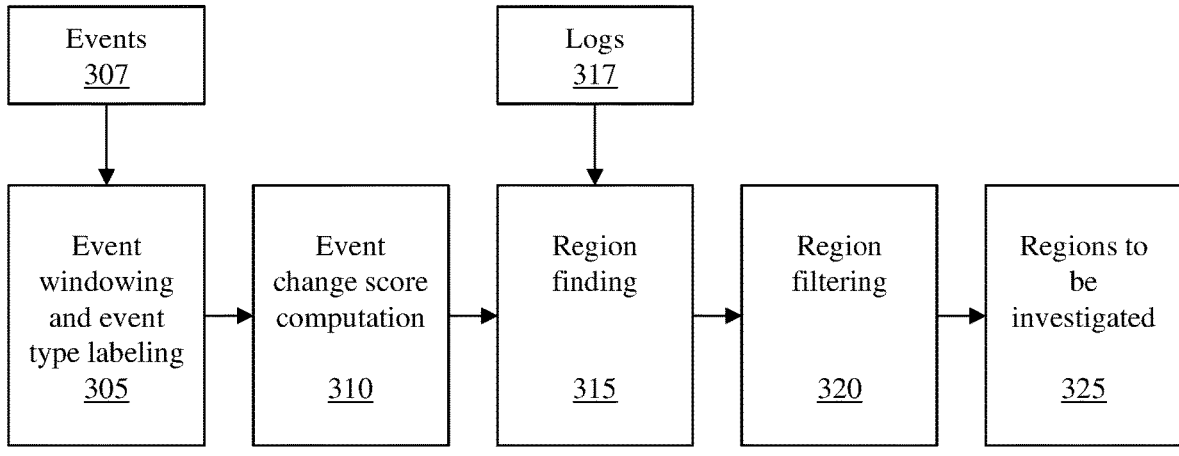
FIG. 3 shows a flowchart of an exemplary method in accordance with aspects of the present invention.

FIG. 3 shows a flowchart of an exemplary method in accordance with aspects of the present invention. Steps of the method may be carried out in the environment of FIG. 2 and are described with reference to elements depicted in FIG. 2.

At block 305, the code 200 performs event windowing and event type labeling. In embodiments, the code 200 obtains data defining a subset of events 307 related to the application that is the subject of the incident. The code 200 determines a type of each event and labels each event in the subset with its determined type of event (e.g., HTTP delay, request timeout, CPU level higher than a threshold, memory usage higher than a threshold, available memory lower than a threshold, disk usage higher than a threshold, available disk lower than a threshold, and network congestion above a threshold). This determining and labeling may be performed using methods such as extracting an event type from data defining the event, using a lookup table that correlates events to event types, analyzing descriptions of the events using natural language processing, etc. In embodiments, the code 200 creates a respective timeseries of each of these determined types of event and defines windows of size 'w' in each time series. Each timeseries may be a univariate time series in which each point indicates whether the event of this type of event occurred at that time. As but one example, the timeseries for event type 'CPU level higher than a threshold' has multiple points in series between times T-Tmax and time T, and each point in the time series indicates whether the event occurred (e.g., the CPU level was higher than the threshold) or did not occur (e.g., the CPU level was not higher than the threshold) at this point in time. The code 200 defines multiple windows of width 'w' for this timeseries, where width "w' is less than the time range [T-Tmax, T] such that there are multiple windows defined for the timeseries. In embodiments, the code 200 creates and windows such a timeseries for each type of event for all the events in the subset of events 307. In embodiments, the respective windows defined for any one timeseries coincide in time with the respective windows defined for all other timeseries. For example, all the respective timeseries have a first window that starts at a same first time (e.g., t0) and ends at a same second time (e.g., t0+w), a second window that starts at a same third time (e.g., t0+w+1) and ends at a same fourth time (e.g., t0+2w), etc.

At block 310, the code computes an event change score for each window in each time series of each type of event. In embodiments, the code 200 determines an event change score for each point in a respective timeseries by: computing a moving average and standard deviation with lag L using the timeseries data for this type of event; for each point in the timeseries, computing a z-score using the moving average and standard deviation; and labeling each point in the timeseries as either high event change score or low event change score based on comparing the z-score of the point in the timeseries to a threshold value. In one example, the code 200 determines the event change score for a window by aggregating the number of high event change score points in the window, aggregating the number of low event change score points in the window, and comparing the aggregated number of high event change score points to the aggregated number of low event change score points for the window. If the aggregated number of high event change score points is greater than the aggregated number of low event change score points for the window, then the code assigns this window a label of high event change score. If the aggregated number of high event change score points is less than the aggregated number of low event change score points for the window, then the code assigns this window a label of low event change score. The code 200 performs this for each respective window in each respective timeseries, such that each respective window in each respective timeseries (for all the types of events) is assigned an event change score label of either high or low.

In embodiments, block 310 includes the code 200 determining an overall score for each window based on the respective event changes scores of each type of event in the respective window. In an illustrative example there are five types of event (e.g., CPU, RAM, disk, IO, HTTP delay) and three windows (e.g., first window, second window, third window). In this example, the code 200 determined at block 310 that for the first window, event type CPU has a high event change score, event type RAM has a high event change score, event type disk has a high event change score, event type IO has a low event change score, and event type HTTP delay has a low event change score. In this example, the code 200 aggregates the event change scores for this window and labels the window according to a majority vote scheme. In this example, the first window is labeled with an overall score of high because the majority voting is 3 to 2 in favor of high. In this example, the code 200 determined at block 310 that for the second window, event type CPU has a low event change score, RAM has a high event change score, disk has a high event change score, IO has a low event change score, and HTTP delay has a low event change score. In this example, the second window is labeled with an overall score of low because the majority voting is 3 to 2 in favor of low. In this example, the code 200 determined at block 310 that for the third window, event type CPU has a high event change score, RAM has a high event change score, disk has a high event change score, IO has a high event change score, and HTTP delay has a low event change score. In this example, the third window is labeled with an overall score of high because the majority voting is 4 to 1 in favor of high. A majority voting scheme as just described is but one exemplary way to determine the overall score for a window based on the scores of the types of events within that particular window. Other scoring formulas may be used. For example, weights may be applied to one or more of the types of events to make their contribution count more or less to the overall score for a window.

In embodiments, still referring to block 310, the windows that are labeled with an overall score of high are identified as regions of interest for this incident and are included in the regions of interest 240 of FIG. 2. Each of the regions of interest is defined by the start time and stop time of the window that corresponds to the region. At block 315, the code 200 determines portions of logs 317 (which correspond to logs 230) that correspond to the times of the identified regions of interest. This may be accomplished by comparing the start time and stop time of each region to timestamps in the log data. In this manner the code find regions of IT log data corresponding to identified regions of interest. In the example use case described above, the first window and third window are identified as regions of interest.

At block 320, the code optionally filters one or more of the regions of interest from block 315. In embodiments, the code 200 uses change-based events to filter the identified regions of interest. In embodiments, the code 200 retains a region of interest based on determining a change-based event occurred in that region, and eliminates from consideration a region of interest based on determining a change-based event did not occur in that region. In the example use case described above, the first window and third window are identified as regions of interest. Continuing this example, if the code 200 finds a change-based event occurred in the time defined by the first window, and finds that a change-based event did not occur in the time defined by the third window, then the first window is retained and the third window is eliminated from the regions of interest. In this example, the first window is the only remaining region of interest, and its start time and stop time define the regions of the logs 317 to be investigated at block 325.

In embodiments, the portions of the logs 317 included in the regions to be investigated 325 are passed to either a user such as an SME for manual incident analysis or to an automated tool for automated incident analysis. The automated analysis can include analyzing the portions of the IT log data, e.g., using machine learning algorithms, to identify patterns in the data associated with the incident. Identifying such patterns is useful in developing remediation actions (e.g., patches, rules, processes, configurations, etc.) aimed at avoiding future occurrences of the incident. This type of analysis can comprise automated root cause analysis (RCA) that uses machine learning to determine a cause of the incident by analyzing the portions of the IT log data determined using the identified regions of interest. In the example described above, the regions to be investigated 325 include log data corresponding only to the first window, and do not include log data corresponding to the second window or the third window. In this manner, the code has dynamically determined the regions to be investigated 325 based on events.

FIG. 4 shows a flowchart of an exemplary method in accordance with aspects of the present invention. Steps of the method may be carried out in the environment of FIG. 2 and are described with reference to elements depicted in FIG. 2.

At step 405, the system receives a notification of an incident associated with an application. The notification may be an alert of an incident generated by a monitoring system that monitors the metrics 215, traces 220, events 225, and logs 230. The application can be a cloud-native application that is part of the service 210. The alert may be received at the code 200.

At step 410, the system obtains data defining a set of events related to the application for a predefined range of time. As described above with respect to FIGS. 2 and 3, the code 200 obtains data defining a subset of events 307 related to the application that is the subject of the incident. This data may be obtained from the events 225 and the logs 230 using the identity of the application. The predefined range of time may be [T-Tmax, T] as described herein.

At step 415, the system creates a timeseries of each type of event in the set of events from step 410. This may be performed in the manner described at block 305 of FIG. 3.

At step 420, the system computes an event change score for each respective type of event for windows of the range of time based the timeseries of the respective type of event. This may be performed in the manner described at block 305 of FIG. 3.

At step 425, the system computes an overall score for each of the windows based on the respective event change scores of the respective event types for each of the windows. This may be performed in the manner described at block 310 of FIG. 3.

At step 430, the system identifies respective ones of the windows as a region of interest based on the overall score of the respective ones of the windows exceeding a threshold. This may be performed in the manner described at blocks 310 and 315 of FIG. 3.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by a processor set, a notification of an incident associated with an application;
obtaining, by the processor set and based on the receiving the notification of the incident, data defining a set of events related to the application for a predefined range of time, wherein the set of events comprises multiple event types;
creating, by the processor set, a multivariate time series comprising respective univariate time series for the multiple event types;
defining, by the processor set, multiple windows within each of the univariate time series;
computing, by the processor set, a respective event change score of low or high for each event in the multiple windows, wherein the event change score is computed as a z-score on a moving average and standard deviation of the univariate time series in the respective window to which the particular event belongs, and wherein the event change score is labeled as low or high based on a comparison of the z-score to a threshold value;
computing, by the processor set, an overall score for each of the multiple windows based on the respective event change scores for each of the windows by aggregating the event change scores and labeling the respective window according to a majority vote scheme, wherein each event in the respective window provides a respective vote for the majority vote scheme; and
identifying, by the processor set, ones of the windows as a region of interest based on the respective overall score of the ones of the windows being labeled as high.

2. The method of claim 1, wherein the application comprises a cloud-native application.

3. The method of claim 1, wherein the data defining the set of events related to the application comprises information technology (IT) log data.

4. The method of claim 1, wherein the set of events comprises metrics-based events.

5. The method of claim 4, further comprising corroborating the identifying of each one of the windows identified as a region of interest, the corroborating comprising:
retaining one of the ones of the windows as a region of interest based on determining a change-based event occurred in the one of the windows; and
eliminating one of the ones of the windows as a region of interest based on determining a change-based event did not occur in the one of the windows.

6. The method of claim 1, further comprising:
determining portions of IT log data defined by the ones of the windows identified as regions of interest; and
passing the determined portions of the IT log data to a user for analysis of the incident.

7. The method of claim 1, further comprising:
determining portions of IT log data defined by the ones of the windows identifies a regions of interest; and
performing automated analysis of the incident using the determined portions of the IT log data.

8. The method of claim 1, wherein the set of events comprises an event type CPU, an event type RAM, an event type disk, an event type IO, and an event type HTTP delay.

9. A computer program product comprising:
one or more computer readable storage media; and
program instructions stored on the one or more computer readable storage media for performing operations comprising:
receiving a notification of an incident associated with an application;
obtaining, based on the receiving the notification of the incident, data defining a set of events related to the application for a predefined range of time, wherein the set of events comprises multiple event types;
creating a multivariate time series comprising respective univariate time series for the multiple event types;
defining event type windows within each of the univariate time series and defining comprehensive windows within the multivariate time series;
computing a respective event change score of low or high for each event in the event type windows, wherein the event change score is computed as a z-score on a moving average and standard deviation of the univariate time series in the respective event type window to which the particular event belongs, and wherein the event change score is labeled as low or high based on a comparison of the z-score to a threshold value;
computing an overall score for each of the event type windows of low or high based on the respective event change scores within the respective event type window by labeling the respective event type window according to a majority vote scheme, wherein each event in the respective window provides a respective vote with its low or high label for the majority vote scheme;
computing an overall comprehensive score for each of the comprehensive windows based on the overall score for each of the event type windows which overlap in time with a respective one of the comprehensive windows, wherein the computing of the overall comprehensive score occurs by performing a comprehensive majority vote scheme, wherein each overall score of the event type windows which overlap in time with the respective one of the comprehensive windows provides a respective vote for the comprehensive majority vote scheme, and wherein each of the comprehensive windows includes events of at least two of the event types; and identifying ones of the windows as a region of interest based on the respective overall comprehensive score of the comprehensive window being labeled as high.

10. The computer program product of claim 9, wherein the application comprises a cloud-native application.

11. The computer program product of claim 9, wherein the data defining the set of events related to the application comprises information technology (IT) log data.

12. The computer program product of claim 9, wherein the set of events comprises metrics-based events.

13. The computer program product of claim 12, wherein the operations further comprise corroborating the identifying of each one of the windows identified as a region of interest, the corroborating comprising:

retaining one of the ones of the windows as a region of interest based on determining a change-based event occurred in the one of the windows; and eliminating one of the ones of the windows as a region of interest based on determining a change-based event did not occur in the one of the windows.

14. The computer program product of claim 9, wherein the operations further comprise:

determining portions of IT log data defined by the ones of the windows identified as regions of interest; and passing the determined portions of the IT log data to a user for analysis of the incident.

15. The computer program product of claim 9, wherein the operations further comprise:

determining portions of IT log data defined by the ones of the windows identifies a regions of interest; and performing automated analysis of the incident using the determined portions of the IT log data.

16. The computer program product of claim 9, wherein the set of events comprises an event type CPU, an event type RAM, an event type disk, an event type IO, and an event type HTTP delay.

17. A system comprising:

a processor set;

one or more computer readable storage media; and program instructions stored on the one or more computer readable storage media to be executed by the processor set to perform operations comprising:

receiving a notification of an incident associated with an application;

obtaining, based on the receiving the notification of the incident, data defining a set of events related to the application for a predefined range of time, wherein the set of events comprises multiple event types;

creating a multivariate time series comprising respective univariate time series for the multiple event types;

defining multiple windows within each of the univariate time series;

computing a respective event change score of low or high for each event in the multiple windows, wherein the event change score is computed as a z-score on a moving average and standard deviation of the univariate time series in the respective window to which the particular event belongs, and wherein the event change score is labeled as low or high based on a comparison of the z-score to a threshold value;

computing an overall score for each of the multiple windows based on the respective event change scores for each of the windows by aggregating the event change scores and labeling the respective window according to a majority vote scheme, wherein each event in the respective window provides a respective vote for the majority vote scheme; and identifying ones of the windows as a region of interest based on the respective overall score of the ones of the windows being labeled as high.

18. The computer program product of claim 17, wherein the operations further comprise:

determining portions of IT log data defined by the ones of the windows identified as regions of interest; and passing the determined portions of the IT log data to a user for analysis of the incident.

19. The computer program product of claim 17, wherein the operations further comprise:

determining portions of IT log data defined by the ones of the windows identifies a regions of interest; and performing automated analysis of the incident using the determined portions of the IT log data.

20. The computer program product of claim 17, wherein the set of events comprises an event type CPU, an event type RAM, an event type disk, an event type IO, and an event type HTTP delay.

* * * * *